(12) United States Patent
Elangovan et al.

(10) Patent No.: US 10,775,781 B2
(45) Date of Patent: Sep. 15, 2020

(54) INTERFACE VERIFICATION FOR VEHICLE REMOTE PARK-ASSIST

(71) Applicant: Ford Global Technologies, LLC, Dearborn, MI (US)

(72) Inventors: Vivekanandh Elangovan, Canton, MI (US); Erick Michael Lavoie, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/626,036

(22) Filed: Jun. 16, 2017

(65) Prior Publication Data

US 2018/0364697 A1 Dec. 20, 2018

(51) Int. Cl.

| | |
|---|---|
| *G06F 3/0488* | (2013.01) |
| *G05D 1/00* | (2006.01) |
| *B62D 15/02* | (2006.01) |
| *G06F 3/044* | (2006.01) |
| *G06F 3/045* | (2006.01) |

(52) U.S. Cl.
CPC ....... *G05D 1/0016* (2013.01); *B62D 15/0285* (2013.01); *G06F 3/044* (2013.01); *G06F 3/045* (2013.01); *G06F 3/04883* (2013.01)

(58) Field of Classification Search
CPC ........ G06F 3/0488; G06F 3/044; G06F 3/045; G05D 1/0016
See application file for complete search history.

(56) References Cited

U.S. PATENT DOCUMENTS

| | | | |
|---|---|---|---|
| 5,959,724 A | 9/1999 | Izumi | |
| 6,275,754 B1 * | 8/2001 | Shimizu | B62D 15/0285 |
| | | | 180/167 |
| 6,356,828 B1 | 3/2002 | Shimizu | |
| 6,452,617 B1 * | 9/2002 | Bates | G06F 3/038 |
| | | | 715/744 |
| 6,476,730 B2 | 11/2002 | Kakinami | |
| 6,477,260 B1 | 11/2002 | Shimomura | |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Phenuel S Salomon
(74) *Attorney, Agent, or Firm* — Frank Lollo; Eversheds Sutherland (US) LLP (57) ABSTRACT

Method and apparatus are disclosed for interface verification for vehicle remote park-assist. An example vehicle system includes a vehicle and a mobile device. The mobile device includes a touchscreen and a controller. The controller is to present, via the touchscreen, an interface of a remote parking app and receive, via the touchscreen, an input to initiate remote parking when the interface is presented. The controller is to temporarily stop presenting the interface and stop initiation of remote parking responsive to continuing to receive the input when the interface is not displayed.

17 Claims, 7 Drawing Sheets

(56) References Cited

U.S. PATENT DOCUMENTS

| | | |
|---|---|---|
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 * | 4/2015 | Waldock ............... G05D 1/0044 340/4.61 |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 * | 9/2016 | Guihot ............... G08C 17/02 |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 * | 4/2019 | Kocienda ............... G06F 3/0482 |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0198190 A1 * | 8/2007 | Bauer ............... B60D 1/62 701/301 |
| 2007/0230944 A1 | 10/2007 | Georgiev |
| 2008/0027591 A1 * | 1/2008 | Lenser ............... G05D 1/0251 701/2 |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 * | 12/2008 | Ando ............... G01C 21/3664 701/431 |
| 2009/0096753 A1 * | 4/2009 | Lim ............... G01C 21/3664 345/173 |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 * | 9/2009 | Gamaley ............... G06F 3/0481 715/736 |
| 2009/0289813 A1 | 11/2009 | Kwiecinski |
| 2009/0309970 A1 | 12/2009 | Ishii |

(56) References Cited

U.S. PATENT DOCUMENTS

| | | |
|---|---|---|
| 2009/0313095 A1 | 12/2009 | Hurpin |
| 2010/0025942 A1 | 2/2010 | Von Rehyer |
| 2010/0061564 A1 | 3/2010 | Clemow |
| 2010/0114471 A1* | 5/2010 | Sugiyama .......... G01C 21/3664 701/532 |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Reyher |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0240382 A1* | 10/2011 | Gettings .............. B62D 55/075 180/9.1 |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich et al. |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar et al. |
| 2013/0211623 A1* | 8/2013 | Thompson ............. G07C 5/008 701/2 |
| 2013/0231824 A1 | 9/2013 | Wilson |
| 2013/0267179 A1* | 10/2013 | Parekh .................. H04W 24/08 455/67.11 |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1* | 4/2014 | Kim ........................ G06F 3/013 715/702 |
| 2014/0096051 A1* | 4/2014 | Boblett .................. G06F 3/017 715/769 |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1* | 8/2014 | Matters ................ G05D 1/0011 701/2 |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1* | 12/2014 | Vulcano ................ G01C 21/36 701/533 |
| 2015/0022468 A1* | 1/2015 | Cha ....................... G06F 3/0416 345/173 |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita et al. |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1* | 12/2015 | Kiriya ................. G06K 9/00355 701/2 |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0153778 A1 | 6/2016 | Singh |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0216929 A1* | 7/2016 | Hua ..................... G06F 3/04817 |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0170494 A1 | 10/2016 | Jeongjun et al. |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0309000 A1* | 10/2016 | Mao ..................... G06Q 50/01 |
| 2016/0349362 A1 | 10/2016 | Rohr |
| 2016/0321445 A1 | 11/2016 | Turgeman et al. |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1* | 12/2016 | Chen ..................... G04G 13/02 |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang et al. |
| 2017/0001650 A1 | 1/2017 | Park |

(56) References Cited

U.S. PATENT DOCUMENTS

| | | |
|---|---|---|
| 2017/0008563 A1 | 1/2017 | Popken et al. |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1* | 7/2017 | Yamada ............... B60W 50/10 |
| 2017/0208438 A1 | 7/2017 | Dickow |
| 2017/0280204 A1* | 9/2017 | Liu .................... H04N 21/8173 |
| 2017/0293494 A1* | 10/2017 | Long .................... G06F 3/0482 |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1* | 12/2017 | Chaudhri ............. G06F 3/0412 |
| 2017/0371514 A1* | 12/2017 | Cullin ................. G06F 3/04842 |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082825 A1 | 3/2018 | Hoffman, Jr. |
| 2018/0088330 A1 | 3/2018 | Giannuzzi |
| 2018/0093663 A1 | 4/2018 | Kim |
| 2018/0105165 A1* | 4/2018 | Alarcon ................. H04L 67/12 |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009051055 A1 | 7/2010 |
| DE | 102009024083 A1 | 12/2010 |
| DE | 102009060169 A1 | 6/2011 |
| DE | 102012008858 A1 | 11/2012 |
| DE | 102011080148 A1 | 1/2013 |
| DE | 102011122421 A1 | 6/2013 |
| DE | 102012200725 A1 | 7/2013 |
| DE | 102013004214 A1 | 9/2013 |
| DE | 102010034129 B2 | 10/2013 |
| DE | 102012215218 A1 | 6/2014 |
| DE | 102012222972 A1 | 6/2014 |
| DE | 102013213064 A1 | 1/2015 |
| DE | 102014009077 A1 | 2/2015 |
| DE | 102013016342 A1 | 4/2015 |
| DE | 102013019771 A1 | 5/2015 |
| DE | 102013019904 A1 | 5/2015 |
| DE | 102014007915 A1 | 12/2015 |
| DE | 102014011802 A1 | 2/2016 |
| DE | 102014011864 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102015221224 A1 | 5/2017 |
| DE | 102016011916 A1 | 6/2017 |
| DE | 102016125282 A1 | 7/2017 |
| DE | 102016211021 A1 | 12/2017 |
| DE | 102016214433 A1 | 2/2018 |
| DE | 102016224529 A1 | 6/2018 |
| DE | 102016226008 A1 | 6/2018 |
| EP | 2289768 A2 | 3/2011 |
| EP | 2295281 A1 | 3/2011 |
| EP | 2653367 A1 | 10/2013 |
| EP | 2768718 B1 | 3/2016 |
| EP | 2620351 B1 | 6/2016 |
| EP | 2135788 B1 | 6/2017 |
| FR | 3021798 A1 | 12/2015 |
| GB | 2344481 A | 6/2000 |
| GB | 2481324 A | 6/2011 |
| GB | 2491720 A | 12/2012 |
| GB | 2497836 A | 12/2012 |
| GB | 2517835 A | 3/2015 |
| GB | 2534471 A | 7/2016 |
| JP | 2000293797 A | 10/2000 |
| JP | 2004142543 A | 5/2004 |
| JP | 2004287884 A | 10/2004 |
| JP | 2005193742 A | 7/2005 |
| JP | 2009090850 A | 4/2009 |
| JP | 2014125196 A | 7/2014 |
| JP | 2014134082 A | 7/2014 |
| JP | 5586450 B2 | 9/2014 |
| JP | 5918683 B2 | 5/2016 |
| JP | 2016119032 A | 6/2016 |
| JP | 2018052188 A | 4/2018 |
| KR | 20090040024 A | 4/2009 |
| KR | 20100006714 A | 1/2010 |
| KR | 20130106005 A | 9/2013 |
| KR | 20160039460 A | 4/2016 |
| KR | 20160051993 A | 5/2016 |
| KR | 10164167 B | 7/2016 |
| WO | WO 2006/064544 A1 | 6/2006 |
| WO | WO 2008/055567 A1 | 5/2008 |
| WO | WO 2010/006981 A1 | 1/2010 |
| WO | WO 2011/141096 A1 | 11/2011 |
| WO | WO 2013/056959 A1 | 4/2013 |
| WO | WO 2013/123813 A1 | 8/2013 |
| WO | WO 2014/103492 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2016/128200 A1 | 8/2016 |

(56) References Cited

FOREIGN PATENT DOCUMENTS

| WO | WO 2016/134822 A1 | 9/2016 |
| WO | WO 2017/062448 A1 | 4/2017 |
| WO | WO 2017/073159 A1 | 5/2017 |
| WO | WO 2017/096307 A1 | 6/2017 |
| WO | WO 2017/096728 A1 | 6/2017 |
| WO | WO 2017/097942 A1 | 6/2017 |
| WO | WO 2017/112444 A1 | 6/2017 |
| WO | WO 2017/118510 A1 | 7/2017 |
| WO | WO 2017/125514 A1 | 7/2017 |

OTHER PUBLICATIONS

Land Rover develops a smartphone remote control for its SUVs, James Vincent, Jun. 18, 2015.
Alberto Broggi and Elena Cardarelli, Vehicle Detection for Autonomous Parking Using a Soft-Cascade ADA Boost Classifier, Jun. 8, 2014.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
Core System Requirements Specification (SyRS), Jun. 30, 2011, Research and Innovative Technology Administration.
Daimler AG, Remote Parking Pilot, Mar. 2016 (3 Pages).
Perpendicular Parking—https://prezi.com/toqmfyxriksl/perpendicular-parking/.
Search Report dated Jan. 19, 2018 for GB Patent Application No. 1711988.4 (3 pages).
Search Repor dated Jul. 11, 2017 for GB Patent Application No. Enter U.S. Appl. No. 15/583,524, Pages (3).
Search Report dated May 21, 2018 for Great Britain Patent Application No. GB 1800277.4 (5 Pages).
Search Report dated Nov. 28, 2017, for GB Patent Application No. GB 1710916.6 (4 Pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.
ChargeItSpot Locations, Find a Phone Charging Station Near You, retrieved at https://chargeitspot.com/locations/ on Nov. 28, 2017.
Land Rover, Land Rover Remote Control Via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
SafeCharge, Secure Cell Phone Charging Stations & Lockers, retrieved at https://www.thesafecharge.com on Nov. 28, 2017.
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2018 for GB Patent Application No. GB 1809842.6 (5 pages).
Al-Sherbaz, Ali et al., Hybridisation of GNSS with other wireless/sensors technologies on board smartphones to offer seamless outdoors-indoors positioning for LBS applications, Apr. 2016, 3 pages.
Jingbin Liu, (Parking: An Intelligent Indoor Location-Based Smartphone Parking Service, Oct. 31, 2012, 15 pages.

\* cited by examiner

INTERFACE VERIFICATION FOR VEHICLE REMOTE PARK-ASSIST

CROSS-REFERENCE TO RELATED APPLICATIONS

This application relates to U.S. patent application Ser. No. 15/626,024 filed Jun. 16, 2017 and U.S. patent application Ser. No. 15/626,033 filed on Jun. 16, 2017, both of which are incorporated by reference in their entireties.

TECHNICAL FIELD

The present disclosure generally relates to remote park-assist and, more specifically, interface verification for vehicle remote park-assist.

BACKGROUND

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead. Further, some vehicles include park-assist features in which the vehicle autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for interface verification for vehicle remote park-assist. An example disclosed vehicle system includes a vehicle and a mobile device. The mobile device includes a touchscreen and a controller. The controller is to present, via the touchscreen, an interface of a remote parking app and receive, via the touchscreen, an input to initiate remote parking when the interface is presented. The controller is to temporarily stop presenting the interface and stop initiation of remote parking responsive to continuing to receive the input when the interface is not displayed.

An example disclosed method for verifying interfaces for remote parking of vehicles includes presenting, via a touchscreen of a mobile device, an interface of a remote parking app. The example disclosed method also includes receiving an input at a controller via the touchscreen to initiate remote parking for a vehicle when the interface is presented, temporarily stopping presentation of the interface, and stopping initiation of remote parking responsive to continuing to receive the input when the interface is not displayed.

An example disclosed tangible computer readable medium includes instructions which, when executed, cause a machine to present, via a touchscreen of a mobile device, an interface of a remote parking app. The instructions which, when executed, also cause the machine to receive an input at a controller via the touchscreen to initiate remote parking for a vehicle when the interface is presented, temporarily stop presentation of the interface, and stop initiation of remote parking responsive to receiving the input when the interface is not displayed.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles also include adaptive cruise control in which the vehicle controls acceleration and/or deceleration of the vehicle so that a speed of the vehicle is maintained while also maintaining a predetermined following distance from other vehicles ahead.

Further, some vehicles include park-assist features (e.g., a remote park-assist feature) in which the vehicle autonomously controls motive functions of the vehicle to park the vehicle into a parking spot. A remote park-assist feature autonomously parks a vehicle when a driver of the vehicle has already exited the vehicle. For example, the driver may position the vehicle near a parking spot, exit the vehicle, and remotely instruct the vehicle (e.g., via a pushing a button or performing a prescribed action on a key fob or mobile device) to autonomously park in the parking spot. A driver may utilize remote parking to park a vehicle in a parking spot in which a driver would subsequently be unable to exit a cabin of the vehicle (e.g., due to a nearby vehicle, wall, or other structure).

The example methods, apparatus, and machine readable media include a remote park-assist system for initiating autonomous parking of a vehicle into parking spot. A mobile device enables a driver to initiate autonomous parking movement while the driver is located outside of the vehicle. As used herein, "remote parking" and "remote park-assist" refer to a vehicle controlling motive functions of the vehicle without direct steering or velocity input from a driver to autonomously park the vehicle into a parking spot while the driver is located outside of the vehicle. For example, a remote park assist-system enables an autonomy unit to control the motive functions of the vehicle to remotely park the vehicle into the parking spot upon initiation from the driver.

The driver moves his or her finger along a touchscreen (e.g., capacitive, resistive) of the mobile device to initiate the autonomous parking movement. The remote park-assist system detects whether the touchscreen has frozen or is buffering and stops initiation of the autonomous parking movement upon detection of the freezing or buffering to prevent undesired autonomous parking movement. To detect screen freezing or buffering, the mobile device temporarily stops presenting an interface of a remote parking app for a short period of time. The remote park-assist system detects system freezing or data buffering if the mobile device continues to provide instructions to the vehicle to perform autonomous parking movement while the interface is not being presented. The remote park-assist system is capable of detecting system freezing or data buffering anywhere along the communication path (e.g., the touchscreen, phone app processing, wireless transmission from the phone, etc.)

Figure 1:
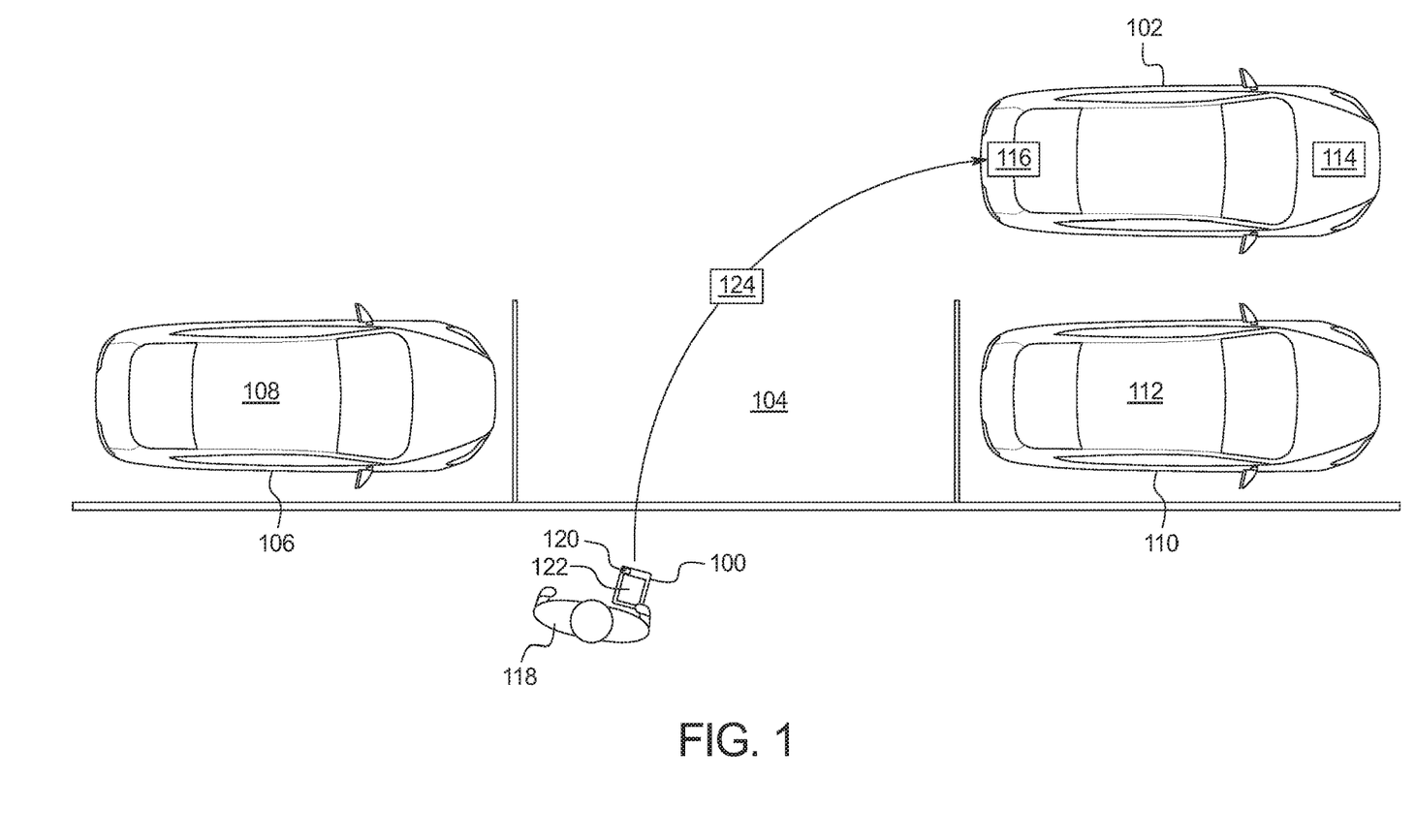
FIG. 1 illustrates an example mobile device utilized for remote parking of an example vehicle in accordance with the teachings herein.

Turning to the figures, FIG. 1 illustrates an example mobile device 100 that is utilized for remote parking in an example vehicle 102 in accordance with the teachings herein. The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a powertrain with an engine, a transmission, a suspension, a driveshaft, wheels, etc. The vehicle 102 may be semi-autonomous (e.g., some routine motive functions controlled by the vehicle 102) or autonomous (e.g., motive functions are controlled by the vehicle 102 without direct driver input).

As illustrated in FIG. 1, the vehicle 102 is positioned to be remotely parked in an available parking spot 104. The available parking spot 104 is positioned between an occupied parking spot 106 (e.g., a first occupied parking spot) that is occupied by a parked vehicle 108 (e.g., a first parked vehicle) and another occupied parking spot 110 (e.g., a second occupied parking spot) by another parked vehicle 112 (e.g., a second parked vehicle). In the illustrated example, the available parking spot 104 is a parallel parking spot. In other examples, the available parking spot 104 into which the vehicle 102 is to park is a perpendicular or other non-parallel parking spot. In the illustrated example, the vehicle 102 is positioned next to the occupied parking spot 106 and/or the parked vehicle 108 to enable the vehicle 102 to be parallel parked in the available parking spot 104 via remote park-assist.

The vehicle 102 of the illustrated example includes an autonomy unit 114. The autonomy unit 114 is an electronic control unit (ECU) of the vehicle 102 that autonomously controls motive functions of the vehicle 102 to remotely park the vehicle 102 in available parking spots (e.g., the available parking spot 104) and/or otherwise autonomously drives the vehicle 102. For example, the autonomy unit 114 controls the motive functions of the vehicle 102 based on data collected from sensor(s) of the vehicle 102 (e.g., sensors 904 of FIG. 9).

The vehicle 102 also includes a communication module 116 (e.g., a first communication module). For example, the communication module 116 is a short-range wireless module for wireless communication with mobile device(s) of user(s) of the vehicle 102. In the illustrated example, the communication module 116 is communicatively connected to a mobile device 100 of a user 118 of the vehicle 102. The communication module 116 includes hardware and firmware to establish a connection with the mobile device 100. In some examples, the communication module 116 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication module 116 may use WiFi, WiMax, NFC, UWB (Ultra-Wide Band), and/or any other communication protocol that enables the communication module 116 to communicatively couple to the mobile device 100.

Prior to communicating with the mobile device 100, the communication module 116 may authenticate the mobile device 100 for communication with the communication module 116. To authenticate communication between the communication module 116 and the mobile device 100, the communication module 116 intermittently broadcasts a beacon (e.g., a low-energy beacon such as Bluetooth® low-energy (BLE) beacon). When the mobile device 100 is within a broadcast range of the communication module 116, the mobile device 100 receives the beacon and subsequently sends a key. The communication module 116 authenticates the mobile device 100 for communication module 116 upon receiving the key from the mobile device 100. In other examples, the mobile device 100 broadcasts a beacon and the communication module 116 subsequently receives the beacon to authenticate communication between the mobile device 100 and the communication module 116.

In the illustrated example, the user 118 (e.g., a driver or other occupant of the vehicle 102) utilizes the mobile device 100 (e.g., a smart phone, a smart watch, a wearable, a tablet, etc.) to initiate remote parking of the vehicle 102 into the available parking spot 104. As illustrated in FIG. 1, the mobile device includes a communication module 120 and a touchscreen 122.

The communication module 120 communicatively connects with other communication modules. For example, the communication module 120 is a short-range wireless module that wirelessly connects to the communication module 116 to establish communication between the mobile device 100 and the vehicle 102. The communication module 120 includes hardware and firmware to establish a connection with the communication module 116 of the vehicle 102. In some examples, the communication module 116 implements Wi-Fi, Bluetooth® and/or Bluetooth® Low Energy (BLE) protocols.

The touchscreen 122 of the mobile device 100 provides an interface (e.g., an interface 200 of FIG. 2, an interface 300 of FIG. 3, an interface 400 of FIG. 4) between the user 118 and the mobile device 100 to enable the user 118 to initiate remote parking of the vehicle 102. For example, the touchscreen 122 is a resistive touchscreen, a capacitive touchscreen, and/or any other type of touchscreen that displays output information to and tactilely receives input information from the user 118 of the mobile device 100. In some examples, the mobile device 100 also includes other input devices (e.g., buttons, knobs, microphones, etc.) and/or output devices (e.g., speakers, LEDs, haptic transducers, etc.) to receive input information from and/or provide output information to the user 118 of the mobile device 100. In operation, the user 118 interacts with the touchscreen 122 for initiating remote parking of the vehicle 102 via the mobile device 100. Based on input received from the user 118 via the touchscreen 122, the communication module 120 of the mobile device sends a signal 124 to the communication module 116 of the vehicle 102 that instructs the autonomy unit 114 to initiate remote parking of the vehicle 102. Initiation of remote parking continues as the touchscreen 122 continues to receive an input from the user 118.

Figure 2:
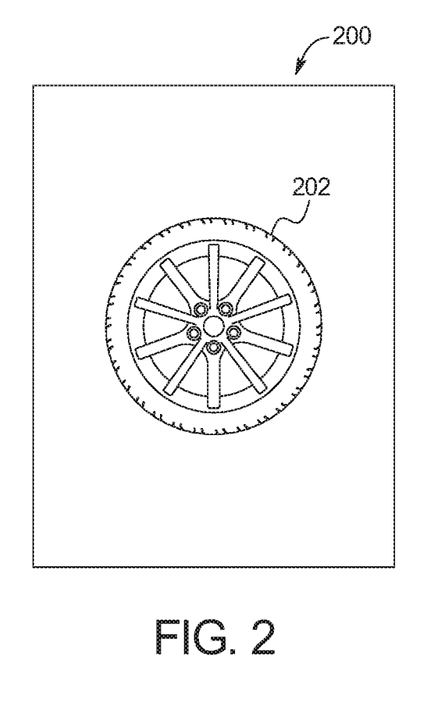
FIG. 2 illustrates an example remote park-assist interface presented via the mobile device of FIG. 1.

FIG. 2 illustrates an example interface 200 of a remote parking app (e.g., a remote parking app 504 of FIG. 5) presented via the touchscreen 122 of the mobile device 100. The interface 200 presented via the touchscreen 122 includes a wheel image 202. The user 118 interacts with the wheel image 202 to initiate remote parking of the vehicle 102 within the available parking spot 104. The user 118 interacts with the wheel image 202 to provide an input by touching or pressing a portion of the touchscreen 122 that corresponds to the wheel image 202. For example, to provide the input that initiates remote parking of the vehicle 102, the user 118 drags his or her finger along the wheel image 202 in a clockwise and/or a counterclockwise direction. In some examples, the wheel image 202 rotates in the clockwise direction as the user 118 drags his or her finger in the clockwise direction and/or the wheel image 202 rotates in the counterclockwise direction as the user 118 drags his or her finger in the counterclockwise direction. Based on the movement detected via the touchscreen 122, the mobile device 100 wirelessly sends the signal 124 to the autonomy unit 114 of the vehicle 102, via the communication module 116 and the communication module 120, to initiate remote parking of the vehicle 102.

In some examples, the mobile device 100 is configured to send the signal 124 to initiate remote parking of the vehicle 102 such that the autonomy unit 114 continues to remotely park the vehicle 102 as long as the touchscreen 122 continues to detect movement of the wheel image 202 regardless of its direction of movement. That is, the autonomy unit 114 performs both forward and backward maneuvers during remote parking the vehicle 102 in response to the touchscreen 122 continuing to detect movement of the wheel image 202 in any single direction (e.g., a clockwise direction or a counterclockwise direction).

In some examples, the mobile device 100 is configured to send the signal 124 to initiate movement of the vehicle 102 in a particular direction during remote parking based on the detected direction of movement of the wheel image 202. For example, the communication module 120 of the mobile device 100 sends the signal 124 to the vehicle 102 to initiate forward motion during remote parking of the vehicle 102 in response to the touchscreen 122 detecting that the user 118 is dragging his or her finger along the wheel image 202 in the clockwise direction. Further, the communication module 120 of the mobile device 100 sends the signal 124 to initiate backward motion during remote parking of the vehicle 102 in response to the touchscreen 122 detecting that a dragging motion along the wheel image 202 in the counterclockwise direction.

Further, in some examples, a speed of motion of rotation of the wheel image 202 corresponds to a travel speed of the vehicle 102 during remote parking. For example, the faster the user 118 causes the wheel image 202 to move, the faster the autonomy unit 114 moves the vehicle 102 during remote parking. Likewise, the slower the user 118 causes the wheel image 202 to move, the slower the autonomy unit 114 moves the vehicle 102 during remote parking.

Figure 3:
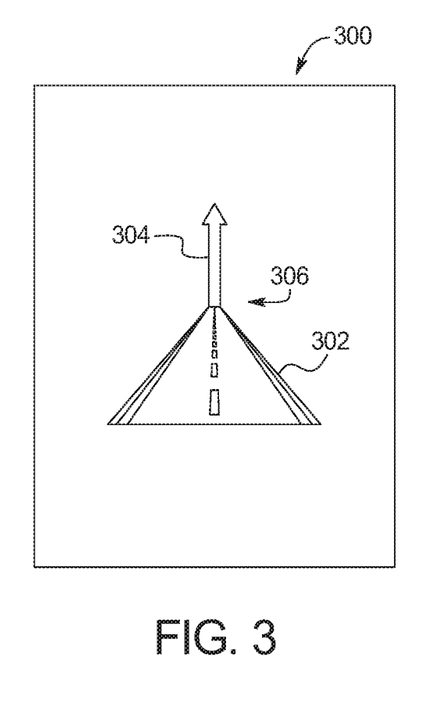
FIG. 3 illustrates another example remote park-assist interface presented via the mobile device of FIG. 1.

FIG. 3 illustrates another example interface 300 of a remote parking app (e.g., the remote parking app 504 of FIG. 5) presented via the touchscreen 122 of the mobile device 100. The interface 300 presented via the touchscreen 122 includes a road 302 and an arrow 304 extending from the road 302. In the illustrated example, the road 302 and the arrow 304 define a line 306 that extends vertically on the interface 300. The user 118 interacts with the road 302, the arrow 304, and/or the line 306 to initiate remote parking. The user 118 interacts with the road 302, the arrow 304, and/or the line 306 to provide an input by touching or pressing a portion of the touchscreen 122 that corresponds to the road 302, the arrow 304, and/or the line 306. For example, the user 118 drags his or her finger along the road 302, the arrow 304, and/or the line 306 in an upward and/or downward direction. Based on the movement detected via the touchscreen 122, the mobile device 100 wirelessly sends the signal 124 to the autonomy unit 114 of the vehicle 102, via the communication module 116 and the communication module 120, to initiate remote parking of the vehicle 102.

In the illustrated example, the mobile device 100 is configured to send the signal 124 to initiate movement of the vehicle 102 in a particular direction during remote parking based on the direction of movement detected via the touchscreen 122. For example, the communication module 120 of the mobile device 100 sends the signal 124 to the vehicle 102 to initiate forward motion during remote parking of the vehicle 102 in response to the touchscreen 122 detecting a dragging motion in an upward direction along the road 302, the arrow 304, and/or the line 306. Further, the communication module 120 sends the signal 124 to initiate backward motion during remote parking of the vehicle 102 in response to detecting a dragging motion in a downward direction along the road 302, the arrow 304, and/or the line 306.

In other examples, the mobile device 100 is configured to send the signal 124 to initiate movement of the vehicle 102 in a particular direction during remote parking based on a touch location detected via the touchscreen 122. For example, the communication module 120 sends the signal 124 to the vehicle 102 to initiate forward motion during remote parking while the touchscreen 122 detects a continuous touch on the line 306 above a center point of the line 306 (e.g., on the arrow 304). Further, the communication module 120 sends the signal 124 to initiate backward motion during remote parking while the touchscreen 122 detects a continuous touch on the line 306 below the center point of the line 306 (e.g., on the road 302). Further, in some examples, a speed of motion along the road 302, the arrow 304, and/or the line 306 corresponds to a travel speed of the vehicle 102 during remote parking.

Figure 4:
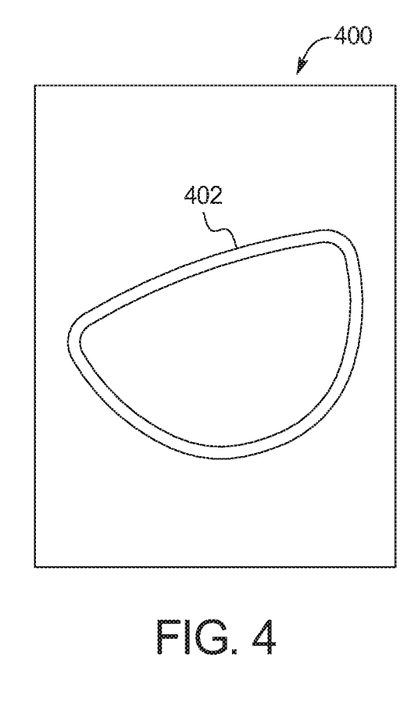
FIG. 4 illustrates another example remote park-assist interface presented via the mobile device of FIG. 1.

FIG. 4 illustrates another example interface 400 of a remote parking app (e.g., the remote parking app 504 of FIG. 5) presented via the touchscreen 122 of the mobile device 100. The interface 400 presented via the touchscreen 122 includes a predefined motion track 402.

As used herein, a "predefined motion track" and a "motion track that is predefined by a user" refer to a continuous track that is presented via the touchscreen to initiate remote parking of vehicle and has been defined based on input from a user prior to being presented via the toucshcreen. As used herein, a "continuous track" and a "continuous path" refer to a path having no start point and no end point (e.g., a circle, an oval, a stadium, etc.) that forms a closed geometric shape. Example motion tracks that are predefined by users are disclosed in U.S. application Ser. No 15/626,024, filed on Jun. 16, 2017, which is incorporated herein by reference in its entirety.

For example, the user 118 interacts with the predefined motion track 402 to initiate remote parking by touching or pressing a portion of the touchscreen 122 that corresponds to the predefined motion track 402. The user 118 drags his or her finger within the predefined motion track 402 in a clockwise and/or a counterclockwise direction to provide an input. Based on the detected motion within the predefined motion track 402, the mobile device 100 wirelessly sends the signal 124 to the autonomy unit 114 of the vehicle 102, via the communication module 116 and the communication module 120, to initiate remote parking of the vehicle 102.

In some examples, the mobile device 100 is configured to send the signal 124 to initiate movement of the vehicle 102 in a particular direction during remote parking based on the detected direction of movement within the predefined motion track 402. For example, the communication module 120 sends the signal 124 to the vehicle 102 to initiate forward motion during remote parking in response to the touchscreen 122 detecting a dragging motion within the predefined motion track 402 in the clockwise direction. Further, the communication module 120 sends the signal 124 to initiate backward motion during remote parking of the vehicle 102 in response to the touchscreen 122 detecting a dragging motion within the predefined motion track 402 in the counterclockwise direction.

In some examples, the mobile device 100 is configured to send the signal 124 to initiate remote parking of the vehicle 102 such that the autonomy unit 114 continues to remotely park the vehicle 102 as long as the touchscreen 122 continues to detect movement within the predefined motion track 402 regardless of the direction of movement. That is, the autonomy unit 114 performs both forward and backward maneuvers during remote parking the vehicle 102 in response to the touchscreen 122 continuing to detect movement within the predefined motion track 402 in a single direction (e.g., a clockwise direction or a counterclockwise direction). Further, in some examples, a speed of motion within the predefined motion track 402 corresponds to a travel speed of the vehicle 102 during remote parking.

Figure 5:
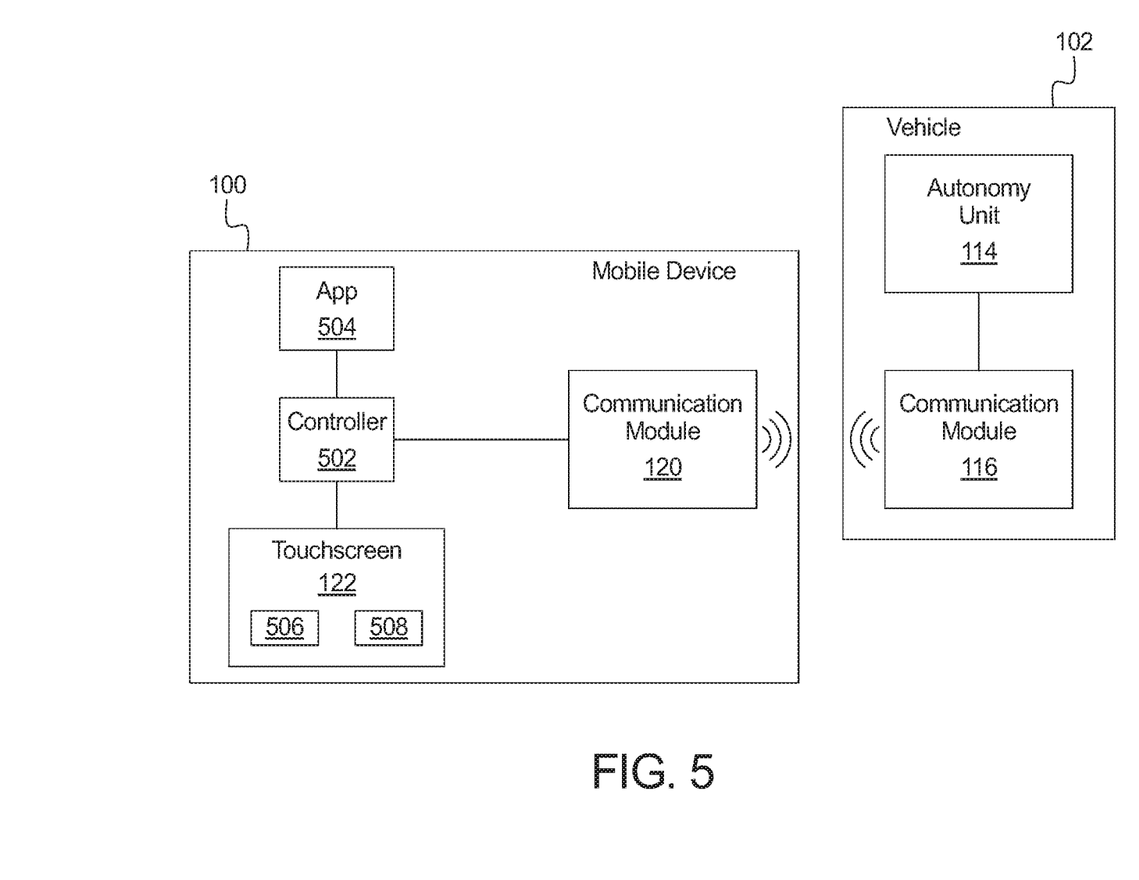
FIG. 5 is a block diagram of the mobile device and the vehicle of FIG. 1.

FIG. 5 is a block diagram of the mobile device 100 and the vehicle 102. As illustrated in FIG. 5, the mobile device 100 includes the touchscreen 122, a controller 502, a remote parking app 504, and the communication module 120. The controller 502 is communicatively coupled to the remote parking app 504, the touchscreen 122, and the communication module 120 within the mobile device 100. The autonomy unit 114 and the communication module 116 are communicatively coupled together within the vehicle 102. Further, the communication module 120 of the mobile device 100 and the communication module 116 of the vehicle 102 are communicatively coupled together (e.g., via wireless communication). Further, as illustrated FIG. 5, the touchscreen 122 includes a display 506 and sensors 508. The display 506 presents interface(s) to the user 118 of the mobile device 100, and the sensors 508 (e.g., capacitive sensors, resistance sensors) detect input(s) provided by the user 118 of the mobile device 100.

In operation, the controller 502 presents an interface (e.g., the interface 200 of FIG. 2, the interface 300 of FIG. 3, the interface 400 of FIG. 4) of the remote parking app 504 to the user 118 via the display 506 of the touchscreen 122. As the interface is being presented, the controller 502 receives an input (e.g., a dragging motion along the touchscreen 122 such as within along the wheel image 202 of FIG. 2, along the line 306 of FIG. 3, within the predefined motion track 402 of FIG. 4, etc.) provided by the user 118 for initiating remote parking of the vehicle 102. For example, the sensors 508 of the touchscreen 122 detect the input provided by the user 118. The controller 502 of the mobile device 100 sends a signal (e.g., a first signal) to the autonomy unit 114 of the vehicle 102 via the communication module 120 and the communication module 116 to initiate remote parking of the vehicle 102.

Further, the controller 502 temporarily stops the display 506 of the touchscreen 122 from presenting the interface. For example, to determine when to temporarily stop presentation of the interface, the controller 502 identifies a duration that the sensors 508 continuously detect an input provided by the user 118. For example, the controller 502 compares the duration during which the sensors 508 continuously detect the input to a predetermined threshold of time (e.g., about 5 seconds). Upon determining that the sensors 508 continuously receive an input for longer than the predetermined threshold, the controller 502 temporarily stops the display 506 from presenting the interface. For example, the controller 502 temporarily stops presentation of the interface for a predetermined period of time (e.g., about 1 millisecond). In some examples, the controller 502 causes the interface to fade in and out as the display 506 transitions between presenting the interface and not presenting the interface, respectively. In some such examples, the interface presented on the touchscreen 122 via the controller 502 includes a heartbeat type visual for trace graphics to mask the absence of the interface not being presented to the user 118.

In other examples, the controller 502 temporarily stops presentation of the interface when the controller 502 identifies that a finger (e.g., a thumb) of the user 118 interacting with the touchscreen 122 is in a fully extended or nearly fully extended.

While the interface is not being presented, the controller 502 monitors whether the remote parking app 504 continues to receive an input. In some examples, the controller 502 prompts the remote parking app 504 to send a signal to the controller 502 upon the presentation of the interface being temporarily stopped. In other examples, the remote parking app 504 sends the signal to the controller 502 without prompting. For example, the remote parking app 504 sends a first input signal (e.g., a digital data of '0') to the controller 502 that indicates the remote parking app 504 has stopped receiving an input once the interface stopped being presented. The remote parking app 504 sends a second input signal (e.g., a digital data of '1') to the controller 502 that indicates the remote parking app 504 continued to receive an input once the interface stopped being presented. The remote parking app 504 continuing to receive the input indicates that the remote parking app 504 is experiencing buffering or freezing.

To prevent the autonomy unit 114 from continuing to remotely park the vehicle 102 while the remote parking app 504 is experiencing buffering or freezing, the controller 502 stops initiation of remote parking of the vehicle 102 in response to continuing to receive the input while the interface is not being displayed. In some examples, the controller 502 stops sending the signal (e.g., the first signal) to the autonomy unit 114 to stop initiating the remote parking. In other examples, the controller 502 sends another signal (e.g., a second signal) to the autonomy unit 114 via the communication module 120 and the communication module 116 to stop initiating the remote parking. Otherwise, if the input stops being received when the interface is not being displayed, the controller 502 continues to initiate remote parking of the vehicle 102 (e.g., by continuing to send the first signal to the autonomy unit 114). After, the interface has temporarily stopped being presented for the predetermined period of time (e.g., 1 millisecond), the controller 502 subsequently presents the interface via the display 506 of the touchscreen 122 (e.g., after which the monitoring sequence may repeat).

In some examples, the touchscreen 122 provides input to a standard design kit (SDK) indicating that the interface is temporarily stopped, and the sensors 508 provide input to the SDK when there is a signal from the touchscreen 122 to the SDK. If there is 'Data input 0' then the SDK makes sure there is no buffer. Further, in such examples, the SDK can provide an input indicating that the interface needs to be stopped, and the interface will be temporarily stopped from being displayed via the display 506. In such instances, the sensors 508 will provide an input to the SDK whether it is 'Data input 0' or 'Data input 1'.

Figure 6:
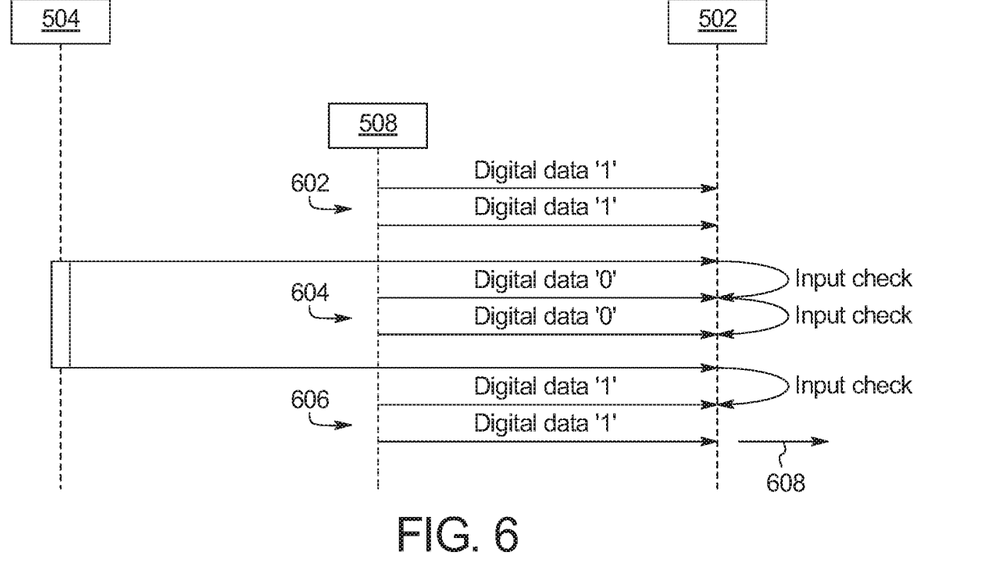
FIG. 6 is a schematic depicting detection of no buffering or freezing during operation of a remote parking app on the mobile device of FIG. 1.
Figure 7:
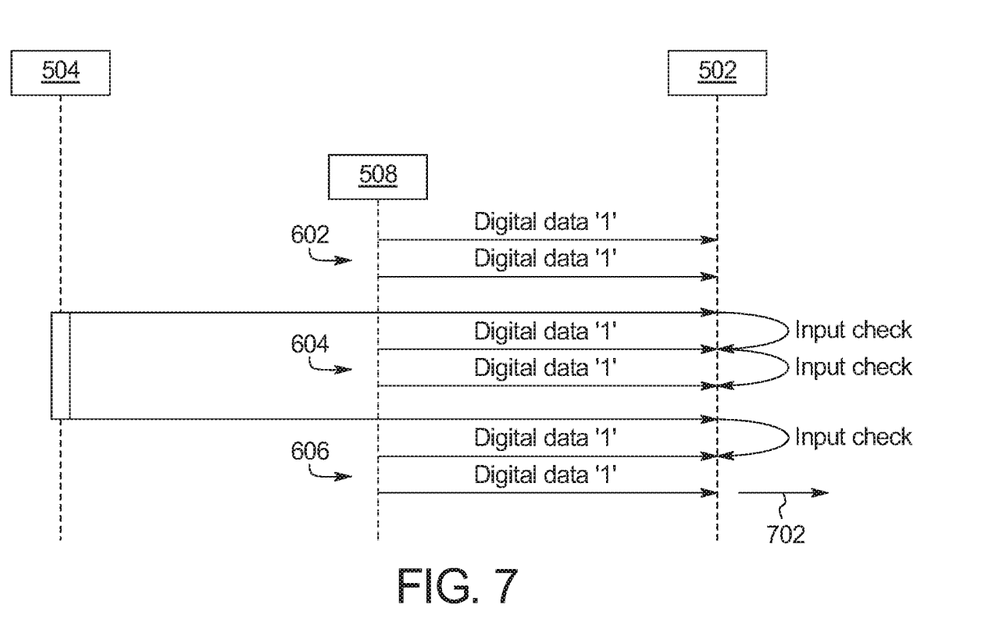
FIG. 7 is a schematic depicting detection of buffering or freezing during operation of a remote parking app on the mobile device of FIG. 1.

FIG. 6 is a schematic depicting detection of no buffering during operation of the remote parking app 504 on the mobile device 100. FIG. 7 is a schematic depicting detection of buffering during operation of the remote parking app 504 on the mobile device 100.

As illustrated in FIGS. 6 and 7, the controller 502 receives first input(s) 602 from the sensors 508 of the touchscreen 122 when the display 506 of the touchscreen 122 presents the interface. The controller 502 receives second input(s) 604 from the remote parking app 504 when presentation of the interface is temporarily stopped. Further, the controller 502 receives third input(s) 606 from the sensors 508 of the touchscreen 122 when the interface is again subsequently presented via the display 506 of the touchscreen 122.

In FIG. 6, the first input(s) 602 are signal(s) (e.g., digital data of '1') that indicate the sensors 508 of the touchscreen 122 have received the input via the sensors 508, the second input(s) 604 are signal(s) (e.g., a digital data of '0') that indicate the remote parking app 504 has stopped receiving the input while the interface is not being presented, and the third input(s) 606 are signal(s) (e.g., digital data of '1') that indicate the sensors 508 of the touchscreen 122 have again received the input via the sensors 508 when the interface is being presented. When the second input(s) 604 indicate that the remote parking app 504 has stopped receiving the input while the interface is not being presented, the controller 502 sends a first signal 608 to the vehicle 102 to continue initiation of remote parking of the vehicle 102.

In FIG. 7, the first input(s) 602 are signal(s) (e.g., digital data of '1') that indicate the sensors 508 of the touchscreen 122 have received the input via the sensors 508, the second input(s) 604 are signal(s) (e.g., a digital data of '1') that indicate the remote parking app 504 has continued to receive the input while the interface is not being presented, and the third input(s) 606 are signal(s) (e.g., digital data of '1') that indicate the sensors 508 of the touchscreen 122 have again received the input via the sensors 508 when the interface is being presented. When the second input(s) 604 indicate that the remote parking app 504 has continued to receive the input while the interface is not being presented, the controller 502 stops sending the first signal 608 and/or sends a second signal 702 to the vehicle 102 to stop initiation of remote parking of the vehicle 102.

Figure 8:
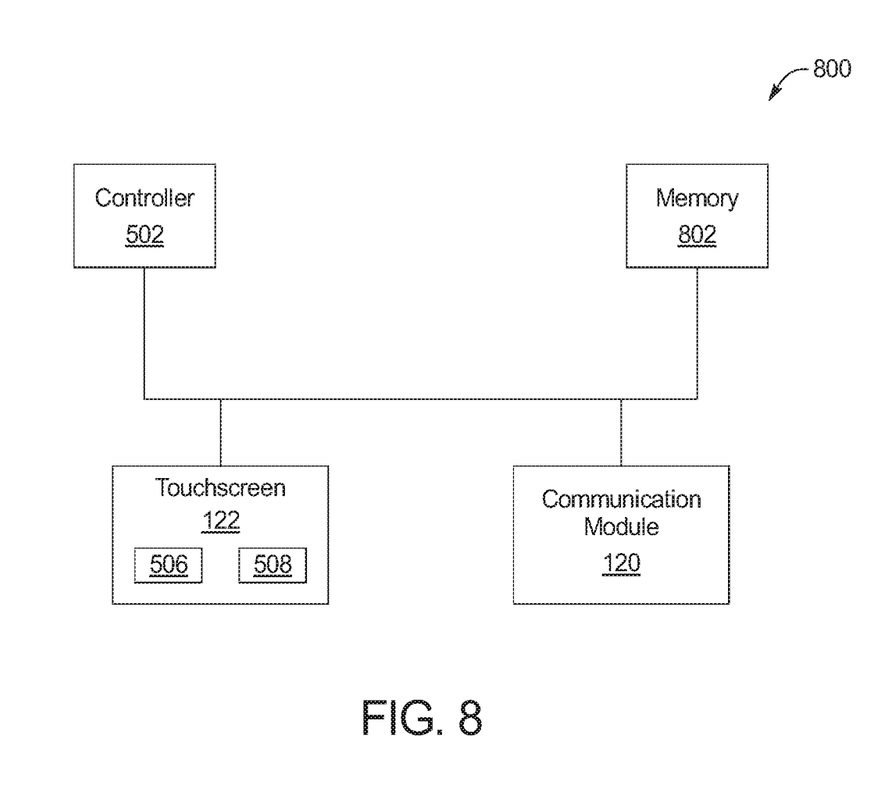
FIG. 8 is a block diagram of electronic components of the mobile device of FIG. 1.

FIG. 8 is a block diagram of electronic components 800 of the mobile device 100. As illustrated in FIG. 8, the electronic components 800 include the controller 502, memory 802, the communication module 120, and the touchscreen 122 that includes the display 506 and the sensors 508.

The controller 502 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 802 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 802 includes multiple kinds of memory, particularly volatile memory and non-volatile memory.

The memory 802 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 802, the computer readable medium, and/or within the controller 502 during execution of the instructions. For example, the remote parking app 504 includes one or more sets of instructions that are embedded on the memory 802 and are executed by the controller 502.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 9:
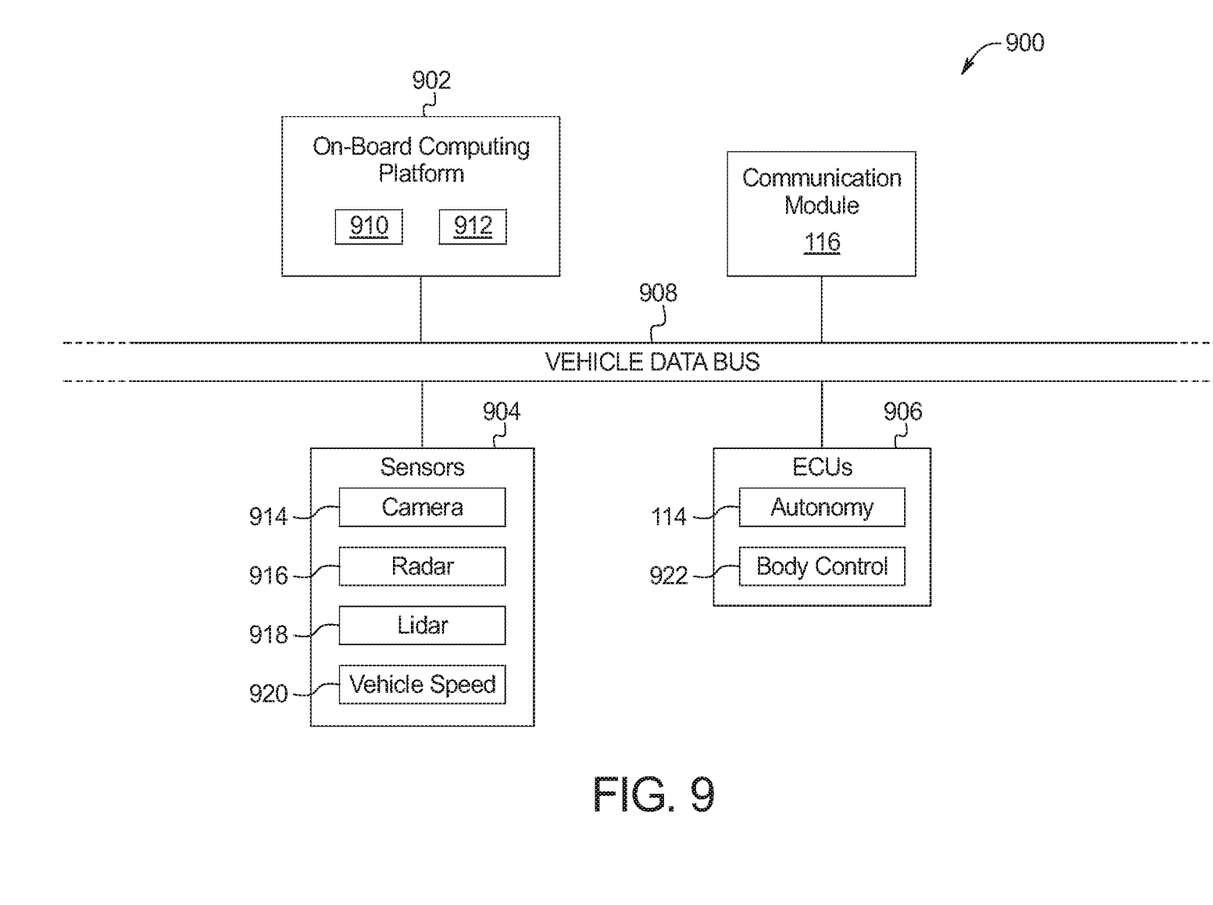
FIG. 9 is a block diagram of electronic components of the vehicle of FIG. 1.

FIG. 9 is a block diagram of electronic components 900 of the vehicle 102. As illustrated in FIG. 9, the electronic components 900 include an on-board computing platform 902, the communication module 116, sensors 904, electronic control units (ECUs) 906, and a vehicle data bus 908.

The on-board computing platform 902 includes a microcontroller unit, controller or processor 910 and memory 912. The processor 910 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 912 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 912 includes multiple kinds of memory, particularly volatile memory and non-volatile memory.

The memory 912 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 912, the computer readable medium, and/or within the processor 910 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 904 are arranged in and around the vehicle 102 to monitor properties of the vehicle 102 and/or an environment in which the vehicle 102 is located. One or more of the sensors 904 may be mounted to measure properties around an exterior of the vehicle 102. Additionally or alternatively, one or more of the sensors 904 may be mounted inside a cabin of the vehicle 102 or in a body of the vehicle 102 (e.g., an engine compartment, wheel wells, etc.) to measure properties in an interior of the vehicle 102. For example, the sensors 904 include accelerometers, odometers, tachometers, pitch and yaw sensors, wheel speed sensors, microphones, tire pressure sensors, biometric sensors and/or sensors of any other suitable type.

In the illustrated example, the sensors 904 include a camera 914, a RADAR sensor 916, a LIDAR sensor 918, and a vehicle speed sensor 920. For example, the camera 914 obtains image(s) and/or video to enable detection and location of nearby object(s). The RADAR sensor 916 detects and locates the nearby object(s) via radio waves, and the LIDAR sensor 918 detects and locates the nearby object(s) via lasers. The camera 914, the RADAR sensor 916, and/or the LIDAR sensor 918 monitor an area surrounding the vehicle 102 to facilitate autonomous parking of the vehicle 102 into the available parking spot 104. Further, the vehicle speed sensor 920 monitors a speed of the vehicle 102 to facilitate autonomous parking of the vehicle 102 into the available parking spot 104.

The ECUs 906 monitor and control the subsystems of the vehicle 102. For example, the ECUs 906 are discrete sets of electronics that include their own circuit(s) (e.g., integrated circuits, microprocessors, memory, storage, etc.) and firmware, sensors, actuators, and/or mounting hardware. The ECUs 906 communicate and exchange information via a vehicle data bus (e.g., the vehicle data bus 908). Additionally, the ECUs 906 may communicate properties (e.g., status of the ECUs 906, sensor readings, control state, error and diagnostic codes, etc.) to and/or receive requests from each other. For example, the vehicle 102 may have seventy or more of the ECUs 906 that are positioned in various locations around the vehicle 102 and are communicatively coupled by the vehicle data bus 908.

In the illustrated example, the ECUs 906 include the autonomy unit 114 and a body control module 922. The autonomy unit 114 autonomously controls motive functions of the vehicle 102, for example, to remotely park the vehicle 102 in the available parking spot 104. The body control module 922 controls one or more subsystems throughout the vehicle 102, such as power windows, power locks, an immobilizer system, power mirrors, etc. For example, the body control module 922 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 908 communicatively couples the communication module 116, the on-board computing platform 902, the sensors 904, and the ECUs 906. In some examples, the vehicle data bus 908 includes one or more data buses interconnected by a gateway. The vehicle data bus 908 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 10:
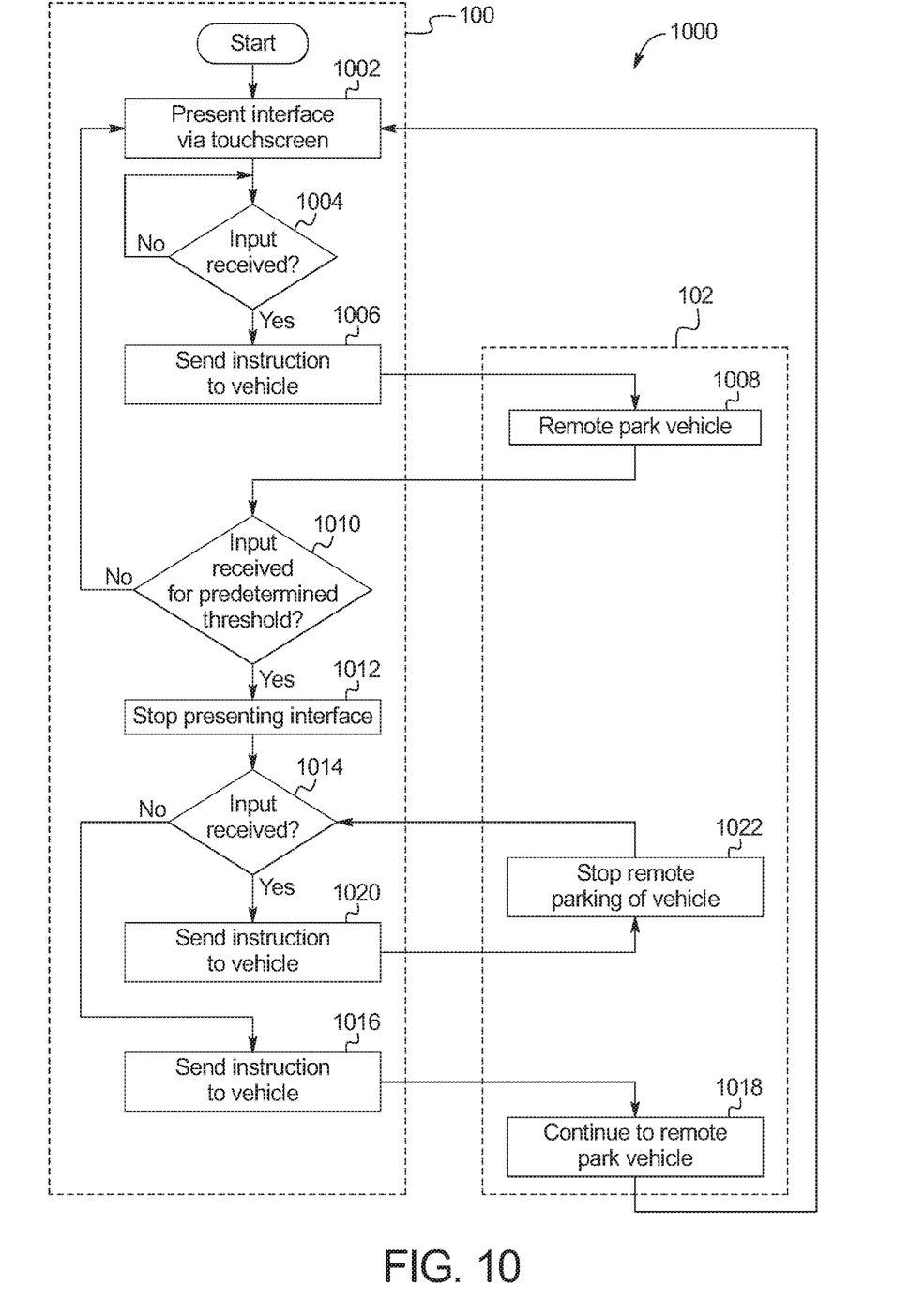
FIG. 10 is a flowchart for verifying an interface of a mobile device for remote parking of a vehicle in accordance with the teachings herein.

FIG. 10 is a flowchart of an example method 1000 to verify an interface of a mobile device for remote parking of a vehicle in accordance with the teachings herein. The flowchart of FIG. 10 is representative of machine readable instructions that are stored in memory (such as the memory 802 of FIG. 8) and include one or more programs that are executed by a processor (such as the controller 502 of FIGS. 5 and 8) of the mobile device 100 of FIGS. 1 and 5-6. Additionally or alternatively, the flowchart of FIG. 10 is representative of machine readable instructions that are stored in memory (such as the memory 912 of FIG. 9) and include one or more programs which, when executed by a processor (such as the processor 910 of FIG. 9), cause the autonomy unit 114 to remotely park the vehicle 102 of FIGS. 1, 5, and 9. While the example program is described with reference to the flowchart illustrated in FIG. 10, many other methods of verifying a remote parking interface on a mobile device may alternatively be used. For example, the order of execution of the blocks may be rearranged, changed, eliminated, and/or combined to perform the method 1000. Further, because the method 1000 is disclosed in connection with the components of FIGS. 1-9, some functions of those components will not be described in detail below.

Initially, at block 1002, the controller 502 of the mobile device 100 presents an interface (e.g., the interface 200 of FIG. 2, the interface 300 of FIG. 3, the interface 400 of FIG. 4) of the remote parking app 504 to the user 118 via the display 506 of the touchscreen 122. At block 1004, the controller 502 determines whether an input has been received via the sensors 508 of the touchscreen 122 while the interface is being presented. In response to the controller 502 determining that an input has not been received from the user 118, the method 1000 remains at block 1004. Otherwise, in response to the controller 502 determining that an input (e.g., a dragging motion along the touchscreen 122 such as within along the wheel image 202 of FIG. 2, along the line 306 of FIG. 3, within the predefined motion track 402 of FIG. 4, etc.) has been received, the method 1000 proceeds to block 1006.

At block 1006, the controller 502 of the mobile device 100 sends an instruction (e.g., a first signal) to the autonomy unit 114 of the vehicle 102 via the communication module 120 and the communication module 116 to initiate remote parking of the vehicle 102. At block 1008, the autonomy unit 114 of the vehicle 102 autonomously parks the vehicle 102 into the available parking spot 104.

At block 1010, the controller 502 determines whether the sensors 508 of the touchscreen 122 have continuously received an input from the user 118 for longer than a predetermined threshold (e.g., about 5 seconds). In response to the controller 502 determining that the sensors 508 have not continuously received an input for longer than the predetermined threshold, the method 1000 returns to block 1002 to continue the presentation of the interface via the touchscreen 122. Otherwise, in response to the controller 502 determining that the sensors 508 have continuously received an input for longer than the predetermined threshold, the method 1012 proceeds to block 1012. At block 1012, the controller 502 temporarily stops presentation of the interface via the display 506 of the touchscreen 122. For example, the controller 502 temporarily stops presenting the interface for a predetermined period of time (e.g., about 1 second).

At block 1014, while the interface is not being presented, the controller 502 determines whether the remote parking app 504 continues to receive the input. For example, the remote parking app 504 sends a first input signal (e.g., a digital data of '0') to the controller 502 that indicates the remote parking app 504 has stopped receiving an input and/or sends a second input signal (e.g., a digital data of '1') to the controller 502 that indicates the remote parking app 504 has continued to receive an input due to buffering or freezing of the remote parking app 504, the touchscreen 122, and/or the wireless communication module 120.

In response to the remote parking app 504 not continuing to receive the input while the interface is not being displayed, the method proceeds to block 1016 at which the controller 502 continues to send the instruction (e.g., a first signal) to the vehicle 102 to initiate remote parking of the vehicle 102. At block 1018, the autonomy unit 114 continues to autonomously park the vehicle 102 into the available parking spot 104.

Otherwise, in response to the remote parking app 504 continuing to receive the input while the interface is not being displayed, the method proceeds to block 1020 at which the controller 502 stops sending the instruction (e.g., the first signal) and/or sends another instruction (e.g., a second signal) to the autonomy unit 114 of the vehicle 102 to stop initiating the remote parking of the vehicle 102. At block 1022, the autonomy unit 114 stops autonomously parking the vehicle 102 while the remote parking app 504 is experiencing buffering or freezing.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A device comprising:
   a processor; and
   memory storing computer-executable instructions, that when executed by the processor, cause the processor to:
      present an interface at the device, the interface associated with a remote vehicle operation application;
      send, based on receiving an input at the interface, instructions to perform a remote vehicle operation;
      temporarily stop presenting the interface during a first period of time;
      determine that instructions to perform the remote vehicle operation continue to be sent during the first period of time;
      stop, based on the determination that instructions to perform remote vehicle operation continue to be sent during the first period of time, sending instructions to perform the remote vehicle operation;
      temporarily stop presenting the interface during a second period of time;
      determine that instructions to perform the remote vehicle operation cease to be sent during the second period of time; and
      continue, based on the determination that instructions to perform the remote vehicle operation continue to be sent during the second period of time, sending instructions to perform the remote vehicle operation.

2. The device of claim 1, wherein the device includes a communication module that is configured to send a first signal to perform the remote vehicle operation and a second signal to stop performing the remote vehicle operation.

3. The device of claim 1, wherein the interface includes a motion track and the input includes a dragging motion within the motion track.

4. The device of claim 1, wherein stopping presentation of the interface is further based on a determination that the input is received continuously for a threshold period of time while the interface is presented.

5. The device of claim 4, wherein temporarily stopping presentation of the interface further comprises temporarily stopping presentation of the interface for a threshold period of time.

6. The device of claim 5, wherein the computer-executable instructions further cause the processor to:
   subsequently present the interface after the threshold period of time has been reached.

7. A method for verifying interfaces for a remote vehicle operation, the method comprising:
   presenting, via a device, an interface, the interface associated with a remote vehicle operation application;
   sending, based on receiving an input at the interface, instructions to perform a remote vehicle operation;

temporarily stopping presentation of the interface during a first period of time;

determining that instructions to perform the remote vehicle operation cease to be sent during the first period of time;

continuing, based on the determination that instructions to perform the remote vehicle operation cease to be sent during the first period of time, sending instructions to perform the remote vehicle operation;

temporarily stopping presentation of the interface during a second period of time;

determining that instructions to perform the remote vehicle operation continue to be sent during the second period of time; and stopping, based on the determination that instructions to perform the remote vehicle operation continue to be sent during the second period of time, sending instructions to perform the remote vehicle operation.

8. The method of claim 7, wherein presenting the interface includes presenting a motion track and the input includes a dragging motion within the motion track.

9. The method of claim 7, wherein temporarily stopping presentation of the interface includes fading out presentation of the interface.

10. The method of claim 7, further comprising:
sending a signal upon temporarily stopping presentation of the interface to determine whether to stop sending instructions to perform the remote vehicle operation.

11. The method of claim 7, wherein stopping sending instructions to perform the remote vehicle operation further comprises:
sending a signal to stop the remote vehicle operation from being performed.

12. The method of claim 7, further comprising:
subsequently presenting the interface after presentation of the interface is temporarily stopped for a threshold period of time.

13. The method of claim 7, wherein the determination that instructions to perform the remote vehicle operation continue to be sent after the interface is not presented comprise a determination that device is frozen or experiencing buffering.

14. The method of claim 7, wherein temporarily stopping presentation of the interface is further based on a determination that the input is received continuously for a threshold period of time.

15. A tangible computer readable medium including computer-executable instructions which, when executed, cause a processor to:
present, via a device, an interface;

send, based on receiving an input at the interface, instructions to perform a remote vehicle operation;

temporarily stop presentation of the interface during a first period of time;

determine that instructions to perform the remote vehicle operation cease to be sent during the first period of time;

continue, based on the determination that instructions to perform the remote vehicle operation cease to be sent during the first period of time, sending instructions to perform the remote vehicle operation;

temporarily stop presentation of the interface during a second period of time;

determine that instructions to perform the remote vehicle operation continue to be sent during the second period of time; and stop, based on the determination that instructions to perform the remote vehicle operation continue to be sent during the second period of time, sending instructions to perform the remote vehicle operation.

16. The tangible computer readable medium of claim 15, wherein the computer-executable instructions further cause the processor to:
present a motion track; and detect a dragging motion within the motion track.

17. The tangible computer readable medium of claim 15, wherein the computer-executable instructions further cause the processor to:
send a signal to stop the remote vehicle operation from being performed.

* * * * *